United States Patent
Lee et al.

(10) Patent No.: US 7,441,176 B2
(45) Date of Patent: Oct. 21, 2008

(54) METHOD AND APPARATUS FOR EFFICIENTLY DETECTING AND/OR CORRECTING ADDRESS INFORMATION OF OPTICAL RECORDING/REPRODUCING APPARATUS

(75) Inventors: Seung-min Lee, Suwon-si (KR); Yoon-woo Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 911 days.

(21) Appl. No.: 10/872,791

(22) Filed: Jun. 22, 2004

(65) Prior Publication Data

US 2005/0041545 A1    Feb. 24, 2005

(30) Foreign Application Priority Data

Jul. 4, 2003    (KR)    ...................... 10-2003-0045389

(51) Int. Cl.
    *G11B 20/18*    (2006.01)
(52) U.S. Cl. .................................. 714/769; 369/124.07
(58) Field of Classification Search .................. 714/746, 714/769; 369/124.07
    See application file for complete search history.

(56) References Cited

U.S. PATENT DOCUMENTS

| | | | | |
|---|---|---|---|---|
| 5,793,724 A * | 8/1998 | Ichikawa et al. | ......... | 369/47.31 |
| 5,815,635 A * | 9/1998 | Seoh | ........................... | 386/113 |
| 5,963,522 A | 10/1999 | Yamamuro | .................... | 369/54 |
| 6,119,259 A * | 9/2000 | Jeong | ......................... | 714/746 |
| 6,175,943 B1 * | 1/2001 | Yim | ............................. | 714/769 |
| 6,400,523 B1 * | 6/2002 | Katayama et al. | ........ | 360/77.04 |
| 6,961,892 B2 * | 11/2005 | Hanano | ...................... | 714/769 |
| 7,047,477 B2 * | 5/2006 | Tolhuizen et al. | ........... | 714/768 |
| 7,079,458 B2 * | 7/2006 | Okazaki et al. | ........... | 369/47.34 |
| 7,134,043 B2 * | 11/2006 | Huang et al. | .................... | 714/5 |
| 7,158,465 B2 * | 1/2007 | Eom | ........................ | 369/59.25 |

FOREIGN PATENT DOCUMENTS

| | | |
|---|---|---|
| JP | 2001-67783 | 3/2001 |
| KR | 2001-0084663 | 9/2001 |
| KR | 2002-0006696 | 1/2002 |

\* cited by examiner

*Primary Examiner*—Stephen M Baker
(74) *Attorney, Agent, or Firm*—Stein, McEwen & Bui, LLP

(57) ABSTRACT

A method of detecting address information for an optical recording and/or reproducing apparatus, including: detecting and/or correcting by using the characteristic of a medium when additional data has a specific value with respect to an area of the medium among address area data on the medium, and/or the characteristic of an address that the address increases by specified unit, an error in detected address area data and outputting the result of error detection and/or correction; and providing optimal address information by using the result of the error detection and/or correction.

48 Claims, 8 Drawing Sheets

| N-3 | | | N-2 | | | N-1 | | | CURRENT ADDRESS | | |
|---|---|---|---|---|---|---|---|---|---|---|---|
| a | b | c | a | b | c+1 | a | b | c+2 | ? | ? | ? |

METHOD AND APPARATUS FOR EFFICIENTLY DETECTING AND/OR CORRECTING ADDRESS INFORMATION OF OPTICAL RECORDING/REPRODUCING APPARATUS

CROSS-REFERENCE TO RELATED APPLICATION

This application claims priority from Korean Patent Application No. 2003-45389 filed Jul. 4, 2003, in the Korean Intellectual Property Office, the disclosure of which is incorporated herein by reference.

BACKGROUND OF THE INVENTION

1. Field of the Invention

The present invention relates to address detection and/or correction, and more particularly, to a method of and apparatus for efficiently detecting and/or correcting address information in an optical recording and/or reproducing apparatus.

2. Description of the Related Art

In an optical recording and/or reproducing apparatus, an address is important information indicating a location on which information is recorded or is to be recorded. Addresses can be broken down into physical addresses that exist even before user data are recorded on a recording medium, and logical addresses that are recorded together with user data when user data are recorded. In addition to address information, additional information may be recorded together on an area where an address is recorded and at this time, an error correction parity for accurately detecting address information/additional information is recorded together.

FIG. 1 is a block diagram of a conventional optical recording and/or reproducing apparatus.

Referring to FIG. 1, reference number 10 indicates a disc, and the optical recording and/or reproducing apparatus comprises a pickup 11, an automatic laser power control (ALPC) circuit 12, a radio frequency amplifier (RF-AMP) 13, a data processor 14, a host interface (I/F) 15, a host 16, a servo processor 17, a motor and driver 18, a micom 19, and an address detector 141 in the data processor 14.

The ALPC 12 controls the quantity of light of the pickup 11 so as to write data on the disc 10 and the RF-AMP 13 amplifies a minute signal picked up by the pickup 11 from the disc 10. The data processor 14 generates data from the amplified signal, detects a physical address from the generated data, performs writing control for the physical address and logical address, and other operations including synchronization signal detection, insertion, protection, modulation and demodulation, and generates a variety of control signals for the RF-AMP 13 and error correction. In addition, the data processor 14 includes the address detector 141 which detects address and/or additional information of an address area from the generated data, and if there is an error in the detected address and/or additional information, corrects the error, and returns the obtained result whenever address information is needed in the data processor 14.

The host interface 15 interfaces the data processor 14 with the host 16. The servo processor 17 performs servo control, including control of a variety motors related to the disc 10, tracking, and focusing. The motor and driver 18 performs functions for driving motors related to rotation of the disc 10, and the micom 19 controls the operation of the entire system of the optical recording and/or reproducing apparatus.

FIG. 2 is an example of the format of an address area on an optical recording medium.

Referring to FIG. 2, the address area comprises address information, additional information and parity information. Here, in some cases, additional information is recorded based on a specified characteristic with respect to an area of a medium, and in order to find this area, address information should be known. That is, only after address information is known, additional information can be known, and in order to find address information, error correction including additional information should be performed. This lowers the error correction efficiency to the extent that the additional information is needed.

FIG. 3 is a flowchart of operations performed in a conventional method for detecting and/or correcting address information, and will now be briefly explained referring to FIG. 1.

Referring to FIG. 3, when the data processor 14 wants to use address information of a disc or additional information in an address area, the data processor 14 detects a synchronization pattern and data corresponding to the address area in operation 31. Through the detected synchronization pattern, data corresponding to the location of the address area are collected to form the address area data, and then by using the detected value of additional information of the address area without change, an error is detected and/or corrected in operation 32. It is determined whether or not there is an error in the address area data of the operation 32, in operation 33, and if there is no error, the detected address and additional information are used without change in operation 34.

If there is an error in the address area data in the operation 33, it is determined whether or not the error is corrected in operation 35, and if the error is corrected, the error-corrected address and additional information are used in operation 36, and if the error is not corrected, the error is indicated in operation 37.

In an additional information field in an address area, data having a different characteristic depending on an area of a disc is contained. In the related art, however, error correction is performed without considering this characteristic. In particular, even when an additional information field is filled with an already known value, error correction is performed without considering this value. This is because in order to know the value of additional information, a current area should be known. That is, information on the current area is address information, which can be known only after error correction for the address information is performed. In addition, since error correction for address information needs to include the additional information, even though a predetermined value is used as additional information, the value cannot be used unless error correction is performed. Accordingly, in the related art, even though additional information corresponding to a predetermined area of a disc is an already known value, the value cannot be used and this is inefficient in the aspect of error correction.

SUMMARY OF THE INVENTION

The present invention provides a method and apparatus for efficiently detecting and/or correcting address information by using additional information that can be known in advance among address information in an optical recording and/or reproducing apparatus.

The present invention also provides a method and apparatus for efficiently detecting and/or correcting address information by using the characteristic of a medium when there is additional data having a predetermined value with respect to an area of a medium among address area data in an optical recording and/or reproducing apparatus.

The present invention also provides a method and apparatus for efficiently detecting and/or correcting address information by using the characteristic of an address that the address increases by predetermined unit.

The present invention also provides a method and apparatus of efficiently detecting and/or correcting address information by utilizing part of data of an already known previous address area even though current address information is not known.

According to an aspect of the present invention, there is provided a method of detecting address information for an optical recording and/or reproducing apparatus, including: detecting and/or correcting by using the characteristic of a medium when additional data has a specific value with respect to an area of the medium among address area data on the medium, and/or the characteristic of an address that the address increases by specified unit, an error in detected address area data and outputting the result of error detection and/or correction; and providing optimal address information by using the result of the error detection and/or correction.

According to another aspect of the present invention, there is provided a method of detecting address information for an optical recording and/or reproducing apparatus, including: detecting address area data containing address and additional information; detecting and/or correcting an error and outputting a first result by using the detected address and additional information without change; replacing only additional information in the detected address data with an already known value for a specified area on an optical recording medium, detecting and/or correcting an error and outputting a second result; and selecting one of the first and second results, according to a specified rule.

According to still another aspect of the present invention, there is provided a method of detecting and/or correcting a current address by using previous address values detected continuously, including: detecting current address area data; detecting and/or correcting an error in the entire address information of the detected current address area data without change and outputting a first result; replacing part of the entire address information with a previous address value, detecting and/or correcting an error in the data and outputting a second result; and selecting one of the first and second results by a specified rule.

According to yet still another aspect of the present invention, there is provided a method of detecting and/or correcting a current address by using previous address values detected continuously, including: detecting current address area data containing address and additional information; detecting and/or correcting an error in the detected address area data without change and outputting a first result; replacing additional information of the detected address area data with an already known value, detecting and/or correcting an error and outputting a second result; replacing part of the address information with a previous address value, detecting and/or correcting an error by using the address information, and outputting a third result; replacing part of the detected address with a previous address value, replacing additional information with an already known value, and detecting and/or correcting an error by using the address information and additional information and outputting a fourth result; and comparing the first through fourth results, and selecting one of the first through fourth results according to a specified rule.

According to a further aspect of the present invention, there is provided an apparatus for detecting an address of an optical recording and/or reproducing apparatus, including: N storage units respectively storing detected address area data regarding a characteristic of a medium when additional data has a specific value with respect to an area of the medium among address area data on the medium, and/or the characteristic of address information that is increased by a specified unit; an error corrector which corrects an error in the outputs of the N storage units storing address area data regarding each characteristic; and a selector which compares error-corrected results according to a specified rule and selects one result from the error-corrected results.

According to an additional aspect of the present invention, there is provided an apparatus for detecting an address of an optical recording and/or reproducing apparatus having a data processor, including: N storage units respectively storing detected address area data regarding a the characteristic of a medium when additional data has a specific value with respect to an area of the medium among address area data on the medium, and/or the characteristic of address information that is increased by a specified unit; an error corrector which corrects an error in the outputs of the N storage units storing address area data regarding each characteristic; and a selector which compares error-corrected results according to a specified rule, selects one result from the error-corrected results and provides the result at the request of the data processor.

According to an additional aspect of the present invention, there is provided an address detection apparatus for detecting address area data containing address and additional information of an optical recording and/or reproducing apparatus, including: a first storage unit which stores the address and additional information as detected without change; a second storage unit which replaces additional information of the detected address area data with an already known value and stores the address area data; an error corrector which corrects an error in data stored in the first and second storage units and respectively outputs a first result and a second result; and a selector which compares the first and second results according a specified rule and selects one of the first and the second results.

According to an additional aspect of the present invention, there is provided an address detection apparatus for detecting a current address of an optical recording and/or reproducing apparatus by using previous address value detected continuously, including: a first storage unit which stores the entire address information of detected current address area data without change; a second storage unit which replaces part of the entire address information with a previous address value and stores the address information; an error corrector which corrects an error in data stored in the first and second storage unit and respectively outputs a first result and a second result; and a comparison and selector which compares the first and second results according to a specified rule and selects one of the first and second results.

According to an additional aspect of the present invention, there is provided an address detection apparatus for detecting and/or correcting a current address of an optical recording and/or reproducing apparatus by using previous address values detected continuously, including: a first storage unit which stores current address area data containing address and additional information without change; a second storage unit which replaces additional information in the detected address area data with an already known value and stores the address area data; a third storage unit which replaces part of the address information with a previous address value and stores the address area data; a fourth storage unit which replaces part of the detected address information with a previous address value, replaces additional information with an already known value and stores the address area data; an error corrector which corrects an error in the data stored in the first through fourth storage units and outputs first through fourth results;

and a comparison and selector which compares the first through fourth results according to a specified rule and selects one result.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Figure 1:
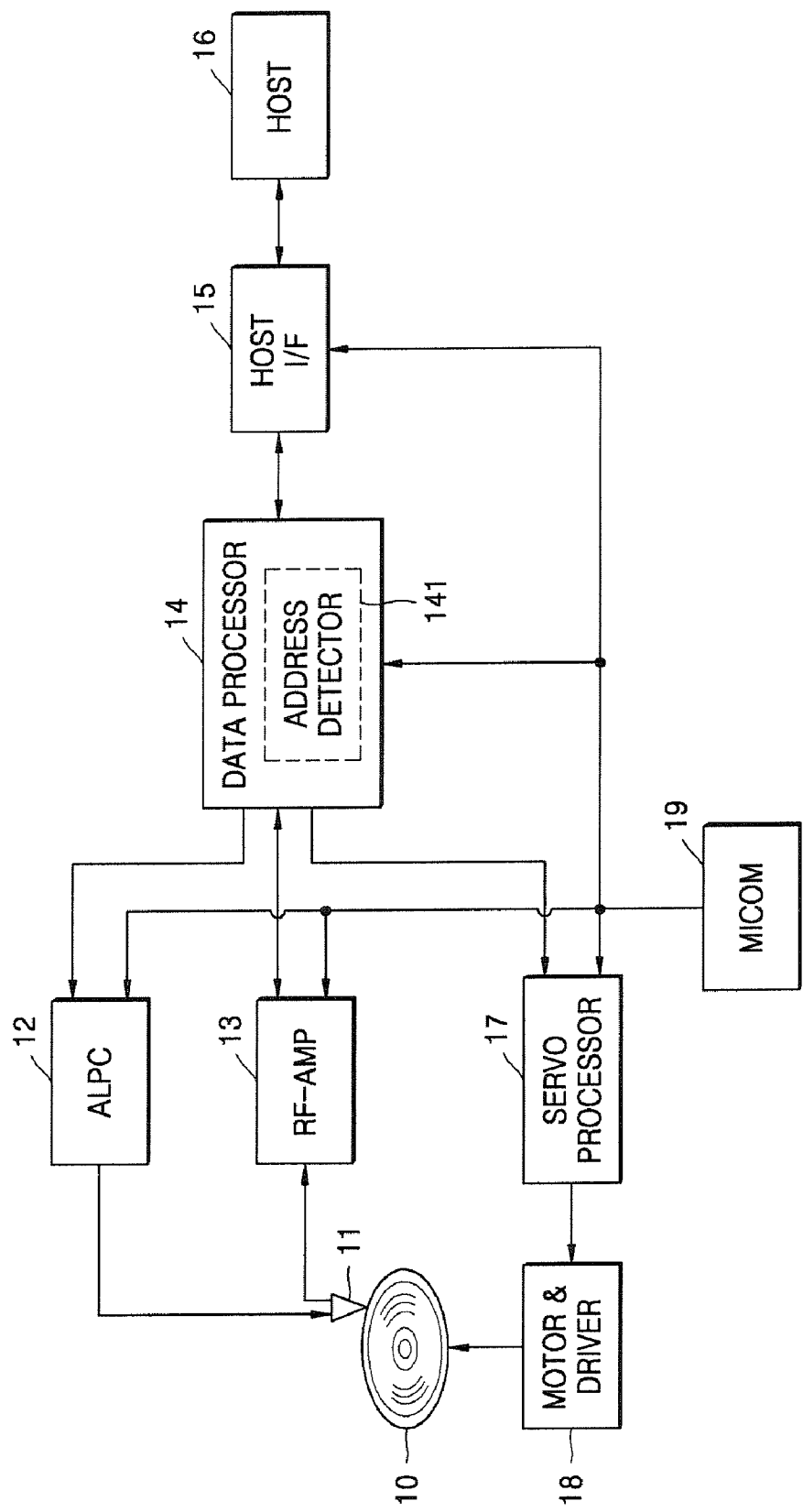
FIG. 1 is a block diagram of a conventional optical recording and/or reproducing apparatus.
Figure 2:
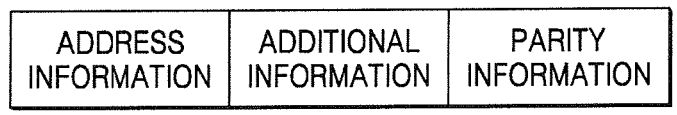
FIG. 2 is an example of the format of an address area on an optical recording medium.
Figure 3:
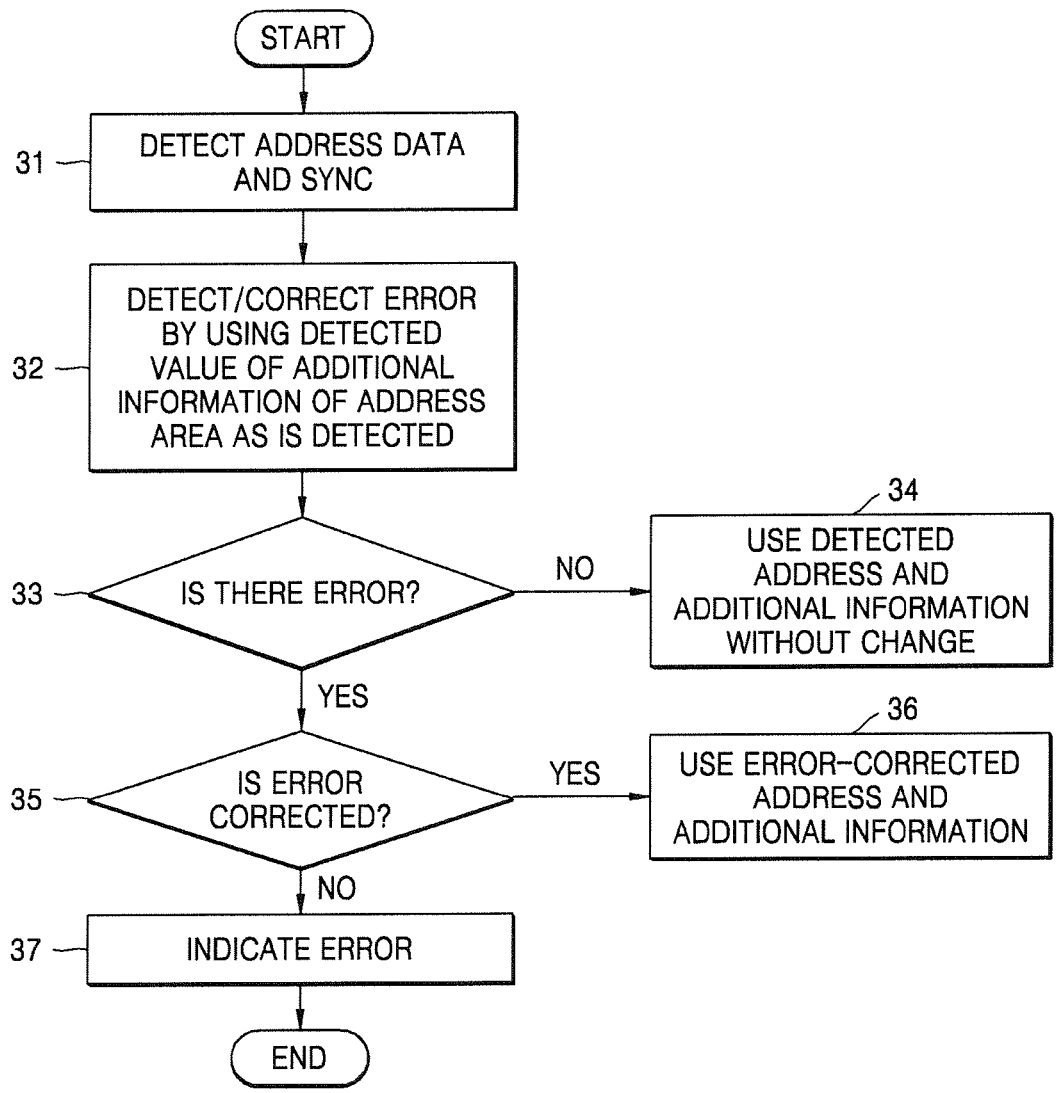
FIG. 3 is a flowchart of a conventional method of detecting and/or correcting address information.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 4:
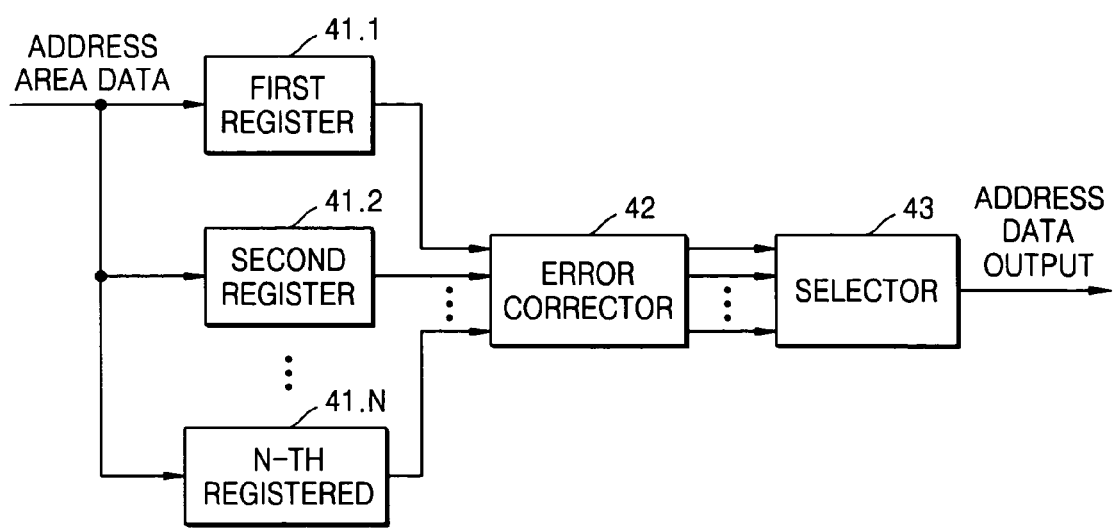
FIG. 4 is a detailed block diagram of an apparatus for detecting and/or correcting address information according to an embodiment of the present invention.

Referring to FIG. 4, in order to detect or correct an error with considering the characteristic of an address area, N registers for storing the same amount of data as one address area are disposed and store data with considering each characteristic. For example, detected address area data is stored in a first register 41.1 without change, after replacing part of the address area with a first characteristic value, is stored in a second register 41.2, and after replacing part of the address area with an (N–1)-th characteristic value, is stored in an N-th register 41.N. The apparatus also comprises an error corrector 42 for correcting an error in the output of N registers 41.1 through 41.N that store address area data with considering each characteristic, and a selector 43 for comparing error-corrected results by a predetermined rule and selecting one result value. Though not shown in the figure, the apparatus may be built to include a display controller which indicates an error when the selector 43 determines that errors occur in all results of error correction.

Figure 5:
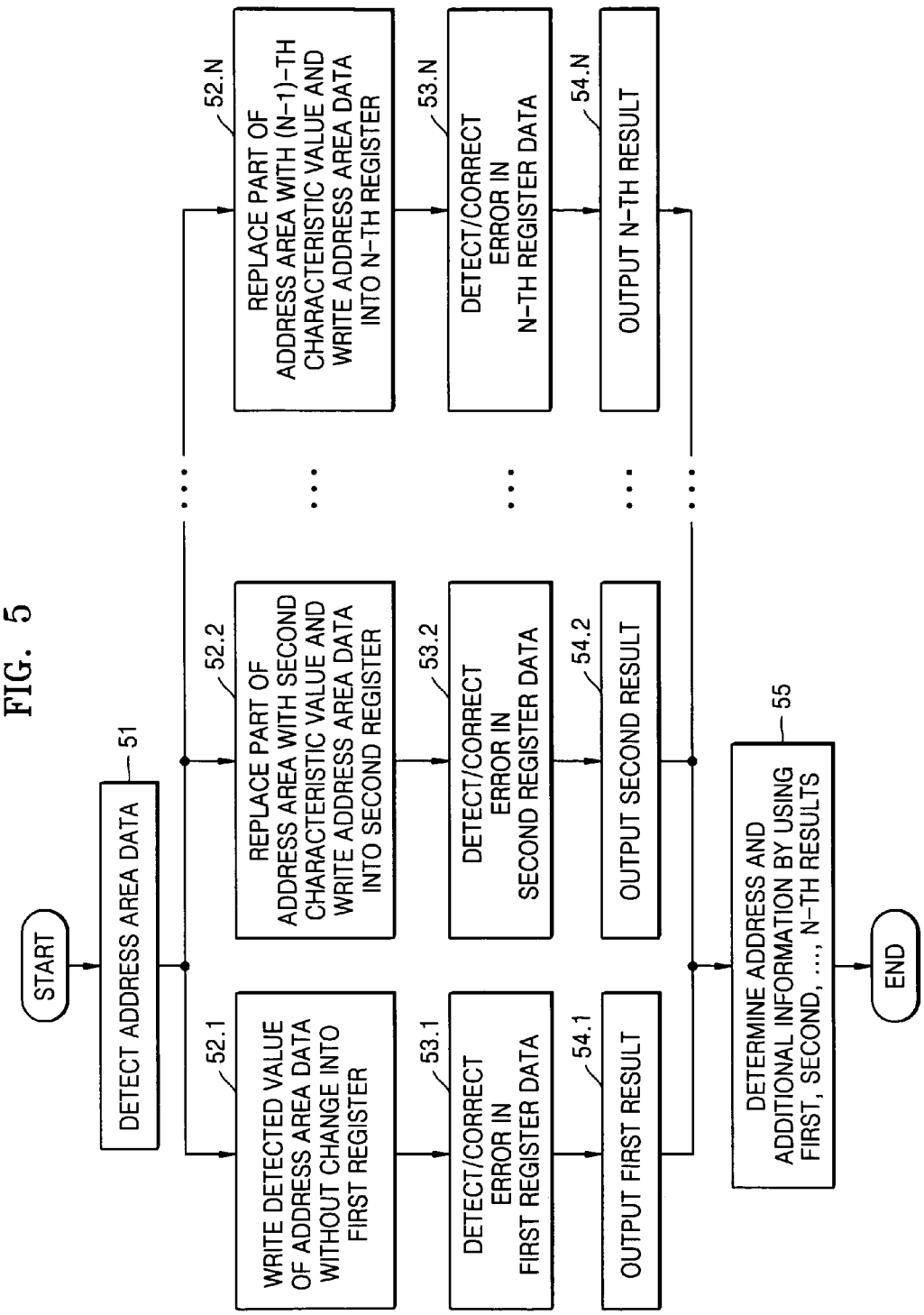
FIG. 5 is a flowchart of a method for detecting and/or correcting address information according to an embodiment of the present invention.

FIG. 5 is a flowchart of a method of detecting and/or correcting address information according to an embodiment of the present invention. According to the method, in each part area of address areas located in predetermined areas of a medium, a predetermined value is stored and if the value is already known, one address area data is detected in an arbitrary area and from this, address information is detected and/or corrected. The method will now be explained with concurrent reference to FIGS. 4 and 5.

Referring to FIG. 5, one address area data is detected in operation 51, and data is written in N registers 41.1 through 41.N. In writing data, detected data is written without change in one register (here, the first register 41.1) in operation 52.1 and is written in other registers after replacing a part with an already known data value of a predetermined area. In the second register 41.2, after part of the detected address area is replaced by a first characteristic value, the data is written in operation 52.2. In the N-th register 41.N, after part of the detected address area is replaced by a first characteristic value, the data is written in operation 52.N.

The error corrector 42 performs error detection or correction for data written in N registers 41.1 through 41.N in operations 53.1 through 53.N, and outputs a first result through an N-th result in operations 54.1 through 54.N. The selector 43 determines one of the results as address and additional information by using the first through N-th results in operation 55.

Figure 6A:
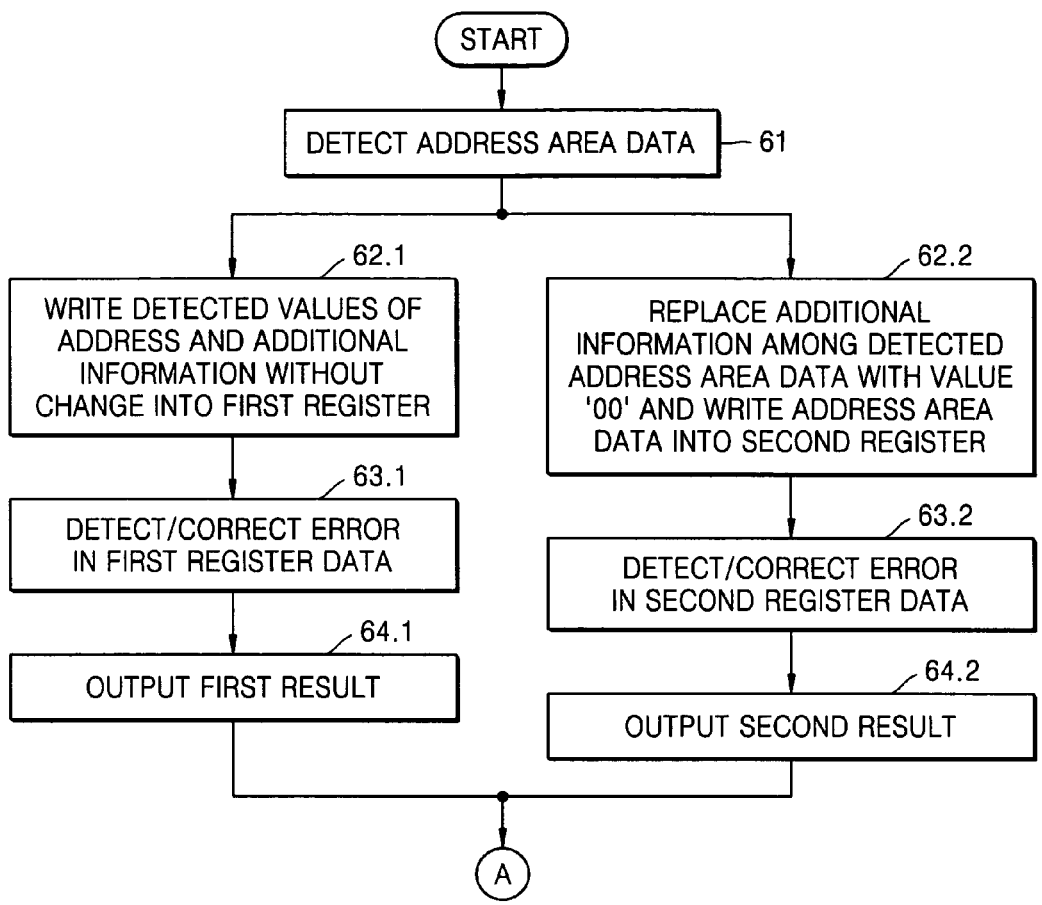
FIGS. 6A and 6B are a flowchart of a method for detecting and/or correcting address information by replacing part of address area data with already known values.
Figure 6B:
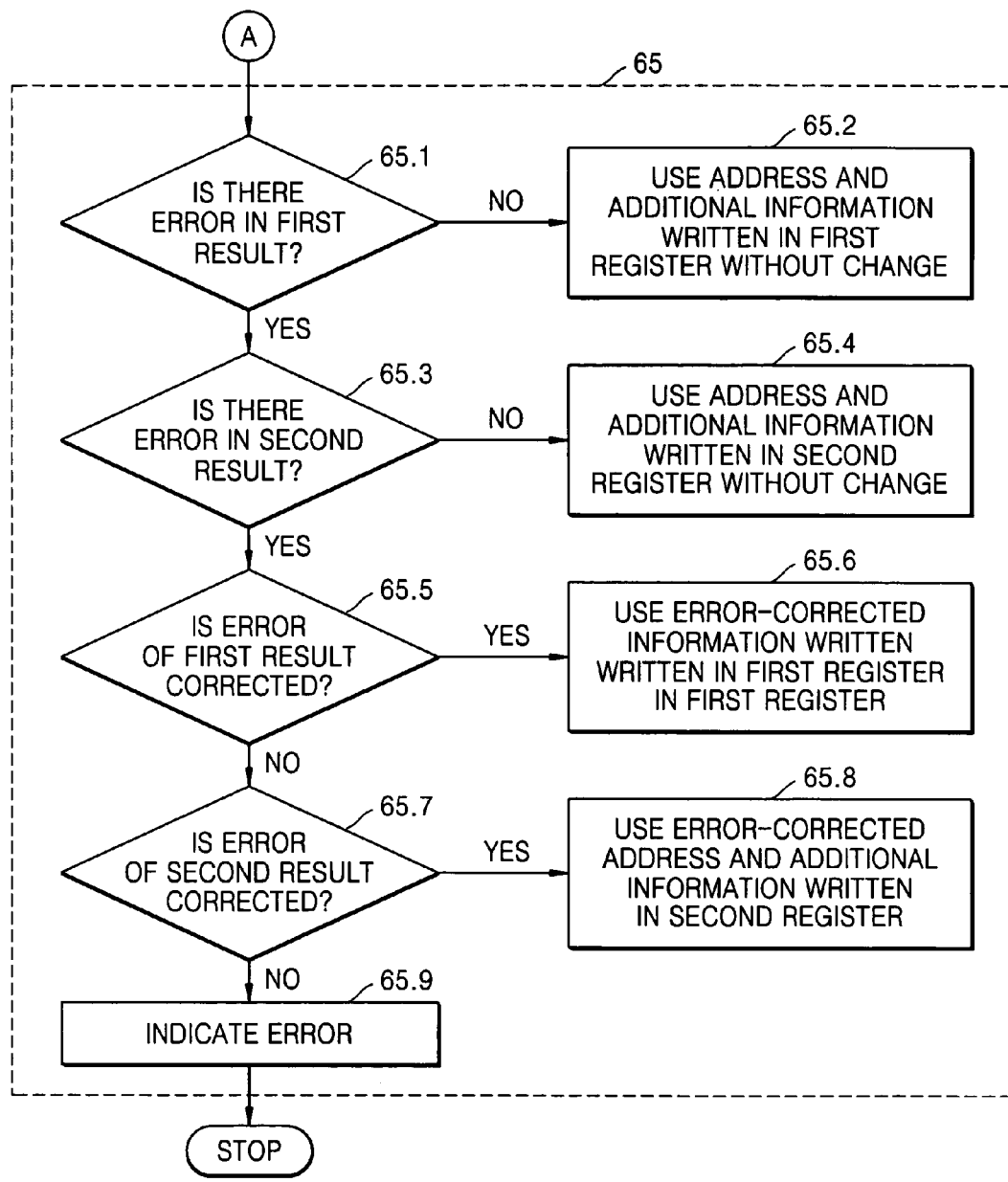

FIGS. 6A and 6B illustrate a flowchart of a method of detecting and/or correcting address information by replacing part of address area data with already known values according to an embodiment of the present invention. According to the method, when the area of a disc is divided into a disc area and a user area in the disc structure, medium information is stored in an additional area in an address area in the disc area, and an additional area in an address area in the user area is not defined and therefore stores '00', additional information among address area data is replaced by '00' so that address information is detected and/or corrected. The method will now be explained with concurrent reference to FIGS. 4, 6A, and 6B.

Referring to FIG. 6A, one address area data is detected in operation 61, and detected values of address and additional information are written in the first register 41.1 without change in operation 62.1. At the same time, only additional information among detected address area data is replaced by '00' and the address area data is written in the second register 41.2 in operation 62.2.

The error corrector 42 detects or corrects an error in the data written in the first register 41.1 in operation 63.1 and outputs the first result in operation 64.1. Also, the error corrector 42 detects or corrects an error in the data written in the second register 41.2 in operation 63.2 and outputs the second result in operation 64.2.

Operation 65 of FIG. 6B showing shows an example of a rule for selecting one result by using the first and second results in the selector 43 and will now be explained.

If no error is detected in the first result in operation 65.1, the first result is used. That is, address and additional information written in the first register 41.1 are used without change in operation 65.2.

If an error is detected in the first result, and if the error is corrected and no error is detected in the second result in operation 65.3, the second result is used. That is, address information written in the second register 41.2 and additional information replaced with '00' are used in operation 65.4.

If there are errors both in the first and second results and if the errors are all successfully corrected, or if only the first result is corrected in operation 65.5, the first result is used.

That is, error-corrected address information and additional information written in the first register 41.1 are used in operation 65.6.

If there are errors both in the first and second results and if only the second result is corrected in operation 65.7, error-corrected address information written in the second register 41.2 and additional information replaced with '00' are used in operation 65.8.

If there are errors both in the first and second results and correction of the errors is all failed, it is regarded as a failure to detect an address and the error is indicated in operation 65.9.

The rule shown in FIG. 6B is a non-limiting example using a priority of correction results. However, it is to be understood that other rules may also be used.

Figures 7, 8:
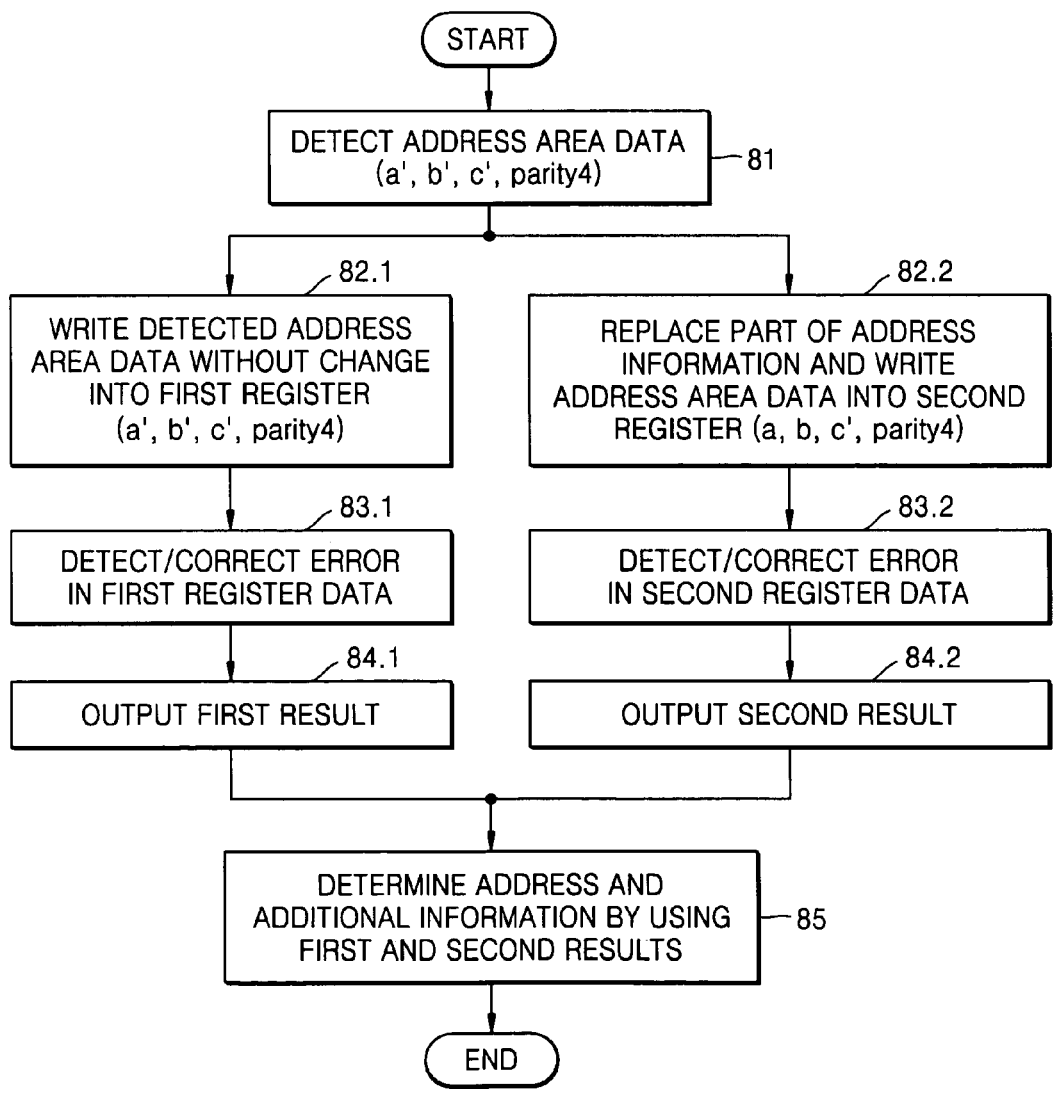
FIG. 7 is an example of the characteristic of address information that is increased by a specified unit.
FIG. 8 is a flowchart of a method for detecting and/or correcting address information by using the characteristic of address information shown in FIG. 7.

FIG. 7 is an example of the characteristic of address information that it increases by a specified unit and shows a case where address information items each formed with 3 bytes are detected continuously and a following address is desired to be found. That is, when (N–3)-th address data is (a, b, c), (N–2)-th address data is (a, b, c+1), and (N–1)-th address data is (a, b, c+2), it is highly probable that the current address is 'previous address+1'.

FIG. 8 is a flowchart of a method of detecting and/or correcting address information by using the characteristic of address information shown in FIG. 7 according to an embodiment of the present invention. FIG. 8 shows an example of obtaining a current address when address data contains 3 bytes for address information, 0 byte for additional information and 3 bytes for parity information (parity), and it is highly probable that the current address (a', b', c') estimated by using continuously detected previous address values is 'previous address+1'. This will now be explained with concurrent reference to FIGS. 4 and 8.

Referring to FIG. 8, current address area data (a', b', c', parity4) is detected in operation 81. It is assumed that in the previous (N–3)-th address area data is (a, b, c, parity1), (N–2)-th address area data is (a, b, c+1, parity2), and (N–1)-th address area data is (a, b, c+2, parity3).

In the first register 41.1, detected address area data (a', b', c', parity4) is written without change in operation 82.1. In the second register 41.2, part of address information is replaced and is written. For example, for the first and second bytes, the continuously detected previous address (a, b) is used and for the lower byte, the detected address c' is used without change such that the address is written in the form of (a, b, c', parity4) in operation 82.2. Here, for the previous address (a, b), an error-corrected one is used.

The error corrector 42 detects and/or corrects an error in the data written in the first register 41.1 in operation 83.1 and outputs the first result in operation 84.1. The error corrector 42 also detects and/or corrects an error in the data written in the second register 41.2 in operation 83.2 and outputs the second result in operation 84.2. By using the first and second results, for example, one address and additional information are determined by a rule such as that in the operation 65 of FIG. 6, in operation 85.

Figure 9:
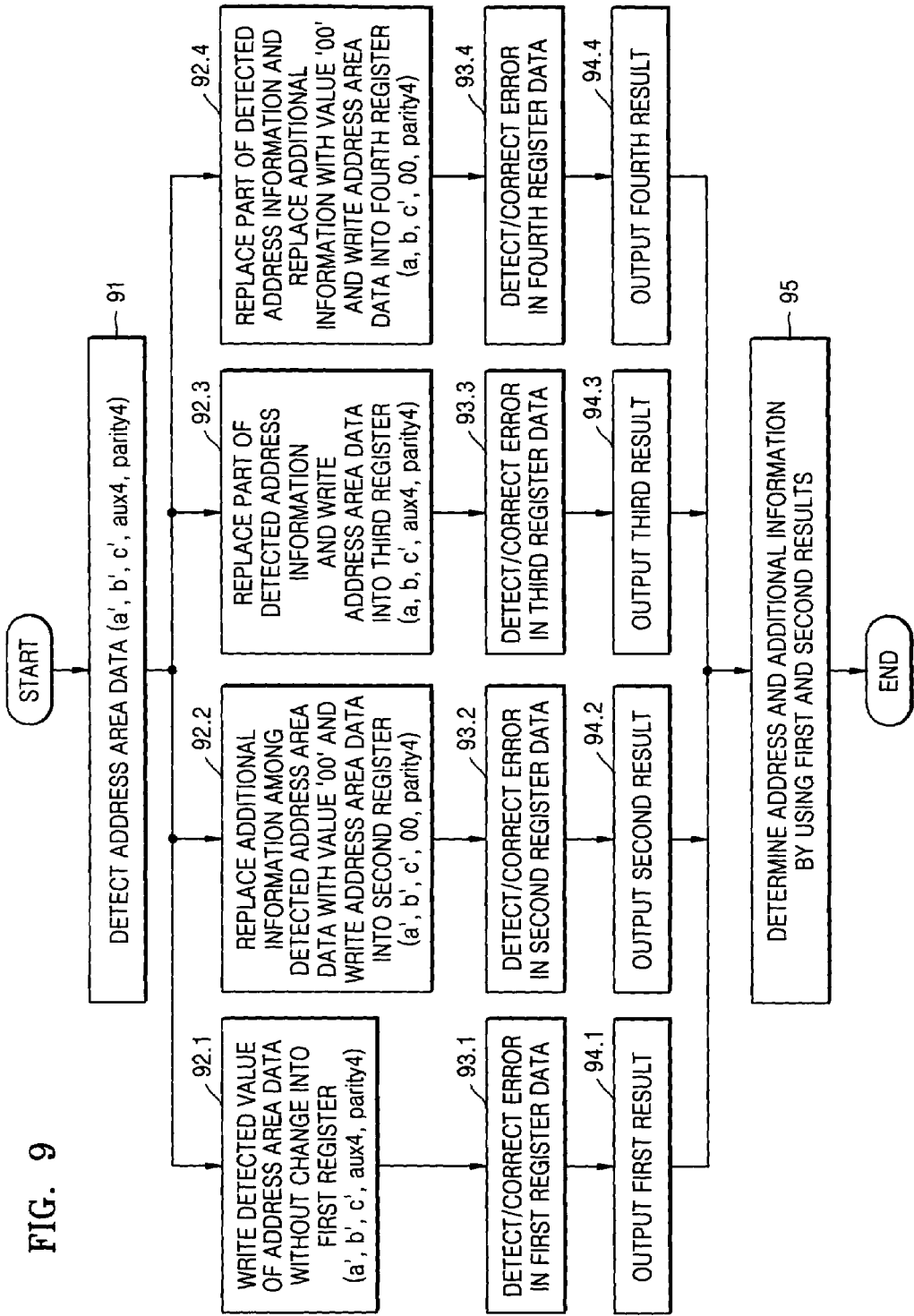
FIG. 9 is a flowchart of a method for detecting and/or correcting address information by using the characteristic of address information shown in FIG. 7.

FIG. 9 is a flowchart of a method of detecting and/or correcting address information by using the characteristic of address information shown in FIG. 7. FIG. 9 shows an example of obtaining a current address when address data contains 3 bytes for address information, 2 bytes for additional information (aux) and 3 bytes for parity information (parity), it is highly probable that the current address estimated by using continuously detected previous address values is 'previous address+1', and additional information is already known. This will now be explained referring to FIG. 4.

Referring to FIG. 9, current address area data (a', b', c', aux4, parity4) is detected in operation 91. It is assumed that in the previous address (N–3)-th address area data is (a, b, c, aux1, parity1), (N–2)-th address area data is (a, b, c+1, aux2, parity2), and (N–1)-th address area data is (a, b, c+2, aux3, parity3).

In the first register 41.1, detected address area data (a', b', c', aux4, parity4) is written without change in operation 92.1. Additional information in the detected address area data is replaced by value '00' such that the data is written in the form of (a', b', c', 00, parity4) in the second register 41.2, in operation 92.2. Part of address information is replaced and is written in the third register. For example, for the first and second bytes, the continuously detected previous address (a, b) is used and for the lower byte, the detected address c' is used without change such that the address is written in the form of (a, b, c', aux4, parity4) in operation 82.3. For the first and second bytes, part of the detected address information, that is, the continuously detected previous address (a, b), is used for replacement and additional information is replaced by value '00' such that the address is written in the form of (a, b, c', 00, parity4) in the fourth register in operation 92.4.

The error corrector 42 detects and/or corrects an error in the data written in the first register 41.1 in operation 93.1 and outputs the first result in operation 94.1. Also, the error corrector 42 detects and/or corrects an error in the data written in the second register 41.2 in operation 93.2 and outputs the second result in operation 94.2. The error corrector 42 detects and/or corrects an error in the data written in the third register in operation 93.3 and outputs the third result in operation 94.3.

The error corrector 42 detects and/or corrects an error in the data written in the fourth register in operation 93.4 and outputs the fourth result in operation 94.4. By using the first through fourth results, the selector 43 determines one address and additional information by a predetermined rule in operation 95.

Here, an example of the predetermined rule will now be explained. If no error in the first result is detected, detected address and additional information corresponding to the first result are used without change. If an error in the first result is detected and corrected and no error in the second result is detected, address and already known additional information corresponding to the second result are used. If errors in both the first and second results are detected and corrected and no error is detected in the third result, partly replaced address information corresponding to the third result and detected additional information are used. If errors are detected in all the first through third results and are corrected and no error is detected in the fourth result, partly replaced address information corresponding to the fourth result and already known additional information are used. If errors are detected in all the first through fourth results and correction is performed, and if all corrections are successful or only the first result is corrected, the error-corrected first result is used. If errors are detected in all the first through fourth results and if the errors are successfully corrected except the first result, or only the second result is corrected, the error-corrected second result is used. If errors are detected in all the first through fourth results and if the errors are successfully corrected except the first and second results, or only the third result is corrected, the error-corrected third result is used. If errors are detected in all the first through fourth results and if only the fourth result is corrected, the error-corrected fourth result is used. If errors are detected in all the first through fourth results and error corrections are all failed, it is regarded as a failure to detect an address and an error is indicated.

According to the above-described embodiments of the present invention, by considering the characteristic that additional area data has a specified value with respect to an area of a medium, the characteristic that couldn't be used in the related art, error detection or correction is performed such that more reliable address information and additional information can be obtained. In addition, by using the characteristic of an address that it increases by specified unit, the present invention can improve the performance for detecting or correcting an error by utilizing part of data of an already known address area even when current address information is not known.

Although a few embodiments of the present invention have been shown and described, the present invention is not limited to the described embodiments. Instead, it would be appreciated by those skilled in the art that changes may be made in these embodiments without departing from the principles and spirit of the invention, the scope of which is defined by the claims and their equivalents.

What is claimed is:

1. A method of detecting address information for an optical recording and/or reproducing apparatus, comprising:
   detecting and/or correcting an error in detected address area data by using a characteristic of a medium that additional data included in the detected address area data has a specific value with respect to an area of the medium among address area data on the medium, and the characteristic of an address that the address included in the detected address area data increases by a specified unit, and outputting the result of the error detection and/or correction; and
   providing optimal address information by using the result of the error detection and/or correction.

2. A method of detecting address information for an optical recording and/or reproducing apparatus, comprising:
   detecting address area data containing address and additional information;
   detecting and/or correcting an error and outputting a first result by using the detected address and additional information without change;
   replacing only additional information in the detected address data with an already known value for a specified area on an optical recording medium, detecting and/or correcting an error and outputting a second result; and
   selecting one of the first and second results, according to a specified rule.

3. The method of claim 2, wherein, in the selecting, when no error is detected in the first result, detected address and information are used without change.

4. The method of claim 2, wherein, in the selecting operation, when an error is detected in the first result and the correcting corrects the first result and no error is detected in the second result, detected address information and additional information obtained by the replacing are used.

5. The method of claim 2, wherein, in the selecting, when errors are detected in both the first and second result, correcting is performed, and at least the first result is corrected, the error-corrected first result is used.

6. The method of claim 2, wherein, in the selecting, when errors are detected in both the first and second results and the correcting corrects only the second result, the error-corrected second result is used.

7. The method of claim 2, further comprising indicating an error when errors are detected in both the first and second results and the correcting is unsuccessful.

8. A method of detecting and/or correcting a current address by using previous address values detected continuously, comprising:
   detecting current address area data;
   detecting and/or correcting an error in the entire address information of the detected current address area data without change and outputting a first result;
   replacing part of the entire address information with a previous address value, detecting and/or correcting an error in the data and outputting a second result; and
   selecting one of the first and second results by a specified rule.

9. The method of claim 8, wherein, in the selecting, when error is detected in the first result, the detected entire address information is used without change.

10. The method of claim 8, wherein, in the selecting, when an error is detected in the first result and the error is corrected and no error is detected in the second result, high order bytes in the entire address information are replaced by previous address values and low order bytes of the detected address information are used without change.

11. The method of claim 8, wherein, in the selecting, when errors are detected in both the first result and second result, the correcting is performed and at least the first result is corrected, the error-corrected first result is used.

12. The method of claim 8, wherein, in the selecting, when errors are detected in both the first and second results and the correcting corrects only the second result, the error-corrected second result is used.

13. The method of claim 8, further comprising indicating an error when errors are detected in both the first and second results and the correcting is successful.

14. The method of claim 8, wherein the current address is 'previous address+1' and a predetermined number of continuous addresses are found according to a rule of 'previous address+1'.

15. The method of claim 8, wherein the previous address used in the outputting a second result is an error-corrected one.

16. A method of detecting and/or correcting a current address by using previous address values detected continuously, comprising:
   detecting current address area data containing address and additional information;
   detecting and/or correcting an error in the detected address area data without change and outputting a first result;
   replacing additional information of the detected address area data with an already known value, detecting and/or correcting an error and outputting a second result;
   replacing part of the address information with a previous address value, detecting and/or correcting an error by using the address information, and outputting a third result;
   replacing part of the detected address with a previous address value, replacing additional information with an already known value, and detecting and/or correcting an error by using the address information and additional information and outputting a fourth result; and
   comparing the first through fourth results, and selecting one of the first through fourth results according to a specified rule.

17. The method of claim 16, wherein, in the selecting, when no error is detected in the first result, the detected entire address information is used without change.

18. The method of claim 16, wherein, in the selecting, when an error is detected in the first result and the correcting corrects the error and no error is detected in the second result, address information and additional information which is replaced by an already known value are used.

19. The method of claim 16, wherein, in the selecting, when errors are detected in the first and second results and the correcting corrects the first and second results and no error is detected in the third result, high order bytes of the address information are replaced by previous address values, low order bytes of the detected address information are used without change, and detected additional information is used.

20. The method of claim 16, wherein, in the selecting, when errors are detected in the first through third results and the correcting corrects the first through third results and no error is detected in the fourth result, high order bytes of the address information are replaced with previous address values, detected low order bytes of the address information are used without change and additional information which is replaced with an already known value is used.

21. The method of claim 16, wherein, in the selecting, when errors are detected in all the first through fourth results and the correcting corrects all of the results or only the first result, the error-corrected first result is used.

22. The method of claim 16, wherein, in the selecting, when errors are detected in the first through fourth results and the correcting corrects the second through fourth results or only the second result, the error-corrected second result is used.

23. The method of claim 16, wherein, in the selecting, when errors are detected in the first through fourth results and the correcting corrects one of the third and fourth results and only the third result, the error-corrected third result is used.

24. The method of claim 16, further comprising indicating an error when errors are detected in the first through fourth results and the correcting does not correct any of the first through fourth results.

25. An apparatus for detecting an address of an optical recording and/or reproducing apparatus, comprising:
  N storage units respectively storing detected address area data regarding a characteristic of a medium that additional data included in the detected address area data has a specific value with respect to an area of the medium among address area data on the medium, and/or a characteristic that address information included in the detected address area data is increased by a specified unit;
  an error corrector which corrects an error in the outputs of the N storage units storing address area data regarding each characteristic; and
  a selector which compares error-corrected results according to a specified rule and selects one result from the error-corrected results.

26. An apparatus for detecting an address of an optical recording and/or reproducing apparatus having a data processor, comprising:
  N storage units respectively storing detected address area data regarding a the characteristic of a medium that additional data included in the detected address area data has a specific value with respect to an area of the medium among address area data on the medium, and/or a characteristic that address information included in the detected address area data is increased by a specified unit;
  an error corrector which corrects an error in the outputs of the N storage units storing address area data regarding each characteristic; and
  a selector which compares error-corrected results according to a specified rule, selects one result from the error-corrected results and provides the result at the request of the data processor.

27. An address detection apparatus for detecting address area data containing address and additional information of an optical recording and/or reproducing apparatus, comprising:
  a first storage unit which stores the address and additional information as detected without change;
  a second storage unit which replaces additional information of the detected address area data with an already known value and stores the address area data;
  an error corrector which corrects an error in data stored in the first and second storage units and respectively outputs a first result and a second result; and
  a selector which compares the first and second results according a specified rule and selects one of the first and the second results based on the comparison.

28. The apparatus of claim 27, wherein, when no error is detected in the first result, the selector selects the output of the first storage unit storing the detected address and additional information without change.

29. The apparatus of claim 27, wherein, when an error is detected in the first result and no error is detected in the second result, the comparison and selector selects the output of the second storage unit storing address information and already known additional information.

30. The apparatus of claim 27, wherein, when errors are detected in both the first and second results and the error corrector corrects at least the first result, the selector selects the error-corrected output of the first storage unit.

31. The apparatus of claim 27, wherein, when errors are detected in both the first and second results and the error corrector corrects only the second result, the selector selects the error-corrected output of the second storage unit.

32. The apparatus of claim 27, further comprising a display controller which, when errors are detected in both the first and second results, and the error corrector does not correct the first and second results, indicates an error.

33. An address detection apparatus for detecting a current address of an optical recording and/or reproducing apparatus by using previous address value detected continuously, comprising:
  a first storage unit which stores the entire address information of detected current address area data without change;
  a second storage unit which replaces part of the entire address information with a previous address value and stores the address information;
  an error corrector which corrects an error in data stored in the first and second storage unit and respectively outputs a first result and a second result; and
  a comparison and selector which compares the first and second results according to a specified rule and selects one of the first and second results based on the comparison.

34. The apparatus of claim 33, wherein, when no error is detected in the first result, the comparison and selector selects the output of the first storage unit.

35. The apparatus of claim 33, wherein, when an error is detected in the first result and the error corrector corrects the first result and no error is detected in the second result, the comparison and selector selects the output of the second storage unit storing high order bytes of the entire address information replaced with previous address values and storing the detected low order bytes without change.

36. The apparatus of claim 33, wherein, when errors are detected in both the first and second results and the error corrector corrects one of the first through fourth results and only the first result, the comparison and selector selects the error-corrected output of the first storage unit.

37. The apparatus of claim 33, wherein, when errors are in detected the first and second results and the error corrector corrects only the second result, the comparison and selector selects the error-corrected output of the second storage unit.

38. The apparatus of claim 33, further comprising a display controller which indicates an error when errors are detected in the first and second results and the error corrector does not correct a result.

39. An address detection apparatus for detecting and/or correcting a current address of an optical recording and/or reproducing apparatus by using previous address values detected continuously, comprising:
- a first storage unit which stores current address area data containing address and additional information without change;
- a second storage unit which replaces additional information in the detected address area data with an already known value and stores the address area data;
- a third storage unit which replaces part of the address information with a previous address value and stores the address area data;
- a fourth storage unit which replaces part of the detected address information with a previous address value, replaces additional information with an already known value and stores the address area data;
- an error corrector which corrects an error in the data stored in the first through fourth storage units and outputs corresponding first through fourth results; and
- a comparison and selector which compares the first through fourth results according to a specified rule and selects one of the first through fourth results based on the comparison.

40. The apparatus of claim 39, wherein, when no error is detected in the first result, the comparison and selector selects the output of the first storage unit.

41. The apparatus of claim 39, wherein, when an error is detected in the first result and the error corrector corrects the first result and no error is detected in the second result, the comparison and selector selects the output of the second storage unit.

42. The apparatus of claim 39, wherein, when errors are detected in both the first and second results and no error is detected in the third result, the comparison and selector selects the output of the third storage unit storing high order bytes in the address information replaced with previous address values, storing the detected low order bytes without change, and storing detected additional information.

43. The apparatus of claim 39, wherein, when errors are detected in all the first through third results and the error corrector corrects the first through third results and no error is detected in the fourth result, the comparison and selector selects the output of the fourth storage unit storing high order bytes in the address information replaced with previous address values, storing the detected low order bytes without change, and storing already known additional information.

44. The apparatus of claim 39, wherein, when errors are detected in the first through fourth results and the error corrector corrects one of the first through fourth results and only the first result, the comparison and selector selects the error-corrected output of the first storage unit.

45. The apparatus of claim 39, wherein, when errors are detected in the first through fourth results and the error corrector corrects one of the second through fourth results and only the second result, the comparison and selector selects the error-corrected output of the second storage unit.

46. The apparatus of claim 39, wherein, when errors are detected in the first through fourth results and the error corrector corrects one of the third and fourth results and only the third result, the comparison and selector selects the error-corrected output of the third storage unit.

47. The apparatus of claim 39, wherein, when errors are detected in the first through fourth results and the error corrector corrects only the fourth result, the comparison and selector selects the error-corrected output of the fourth storage unit.

48. The apparatus of claim 39, further comprising a display controller which, when errors are in all the first through fourth results and the error corrector does not correct any of the first through fourth results, regards it as a failure and indicates an error.

* * * * *